(12) United States Patent
den Boer et al.

(10) Patent No.: US 11,142,281 B2
(45) Date of Patent: Oct. 12, 2021

(54) CYCLE CRANK ASSEMBLY

(71) Applicant: Huron Cycling, LLC, Brighton, MI (US)

(72) Inventors: Willem den Boer, Brighton, MI (US); Timothy E. Brummer, Lompoc, CA (US)

(73) Assignee: HURON CYCLING, LLC, Brighton, MI (US)

( * ) Notice: Subject to any disclaimer, the term of this patent is extended or adjusted under 35 U.S.C. 154(b) by 300 days.

(21) Appl. No.: 16/367,784

(22) Filed: Mar. 28, 2019

(65) Prior Publication Data

US 2019/0315430 A1    Oct. 17, 2019

Related U.S. Application Data

(60) Provisional application No. 62/659,070, filed on Apr. 17, 2018.

(51) Int. Cl.
  *B62M 1/10* (2010.01)
  *B62M 3/00* (2006.01)
  *B62M 1/36* (2013.01)

(52) U.S. Cl.
  CPC .............. *B62M 3/00* (2013.01); *B62M 1/105* (2013.01); *B62M 3/003* (2013.01);
  (Continued)

(58) Field of Classification Search
  CPC .......... B62M 1/105; B62M 1/36; B62M 3/00; B62M 3/003; B62M 21/00; B62M 2003/006; B62K 2201/06; Y10T 74/2164
  See application file for complete search history.

(56) References Cited

U.S. PATENT DOCUMENTS 4,009,623 A * 3/1977 Smith .................... B62K 23/08
                                                      74/512
5,060,536 A   10/1991 Boys
            (Continued)

FOREIGN PATENT DOCUMENTS

CN         2513895 Y     10/2002
CN         1393368 A      1/2003
            (Continued)

OTHER PUBLICATIONS

European Patent Office, Extended European Search Report Issued in Application No. 19169750.7, dated Sep. 18, 2019, Germany, 9 pages.

*Primary Examiner* — Adam D Rogers
(74) *Attorney, Agent, or Firm* — Alleman Hall Creasman & Tuttle LLP

(57) ABSTRACT

A cycle crank assembly includes a crank spindle and a drivetrain connector configured to translate rotation of the crank spindle into rotation of a wheel. A crank arm includes a pedal interface configured to receive a pedal spindle of a cycle pedal. A slip connection is configured to allow the crank arm to rotate about the crank spindle. A resiliently deformable member is connected to the crank spindle and the crank arm proximate to the pedal interface. The resiliently deformable member translates rotation of the crank arm into rotation of the crank spindle. The resiliently deformable member deforms under load to store pedal energy provided by a rider to the cycle pedal and returns at least a portion of the pedal energy when not under load in a direction of the rotation.

20 Claims, 5 Drawing Sheets

(52) U.S. Cl.
CPC ............ *B62K 2201/06* (2013.01); *B62M 1/36* (2013.01); *B62M 2003/006* (2013.01)

(56) References Cited

U.S. PATENT DOCUMENTS

| | | | |
|---|---|---|---|
| 8,516,922 B2* | 8/2013 | Curran | ..................... B62M 3/08 74/594.4 |
| 9,027,439 B2* | 5/2015 | Feltrin | ..................... B62M 3/00 74/594.1 |
| 9,403,576 B2 | 8/2016 | den Boer | |
| 9,809,275 B2 | 11/2017 | den Boer et al. | |
| 10,343,745 B2* | 7/2019 | Meyer | ..................... B62M 3/00 |
| 2004/0211289 A1 | 10/2004 | Chiang et al. | |
| 2004/0237708 A1 | 12/2004 | Hilber | |
| 2012/0304810 A1 | 12/2012 | Butterfield et al. | |
| 2015/0007688 A1 | 1/2015 | Feltrin | |
| 2015/0175241 A1 | 6/2015 | Malloy | |

FOREIGN PATENT DOCUMENTS

| | | |
|---|---|---|
| CN | 2533055 Y | 1/2003 |
| CN | 2617670 Y | 5/2004 |
| CN | 104512514 A | 4/2015 |
| CN | 104724242 A | 6/2015 |
| DE | 19900680 A1 | 7/2000 |
| EP | 0392063 A1 | 10/1990 |
| EP | 2213566 A1 | 8/2010 |
| TW | M286179 U | 1/2006 |
| TW | M409219 U | 8/2011 |

* cited by examiner

CYCLE CRANK ASSEMBLY

CROSS REFERENCE TO RELATED APPLICATIONS

This application claims priority to U.S. Provisional Patent Application Ser. No. 62/659,070, filed Apr. 17, 2018, the entire contents of which is hereby incorporated herein by reference for all purposes.

DETAILED DESCRIPTION

Figure 1:
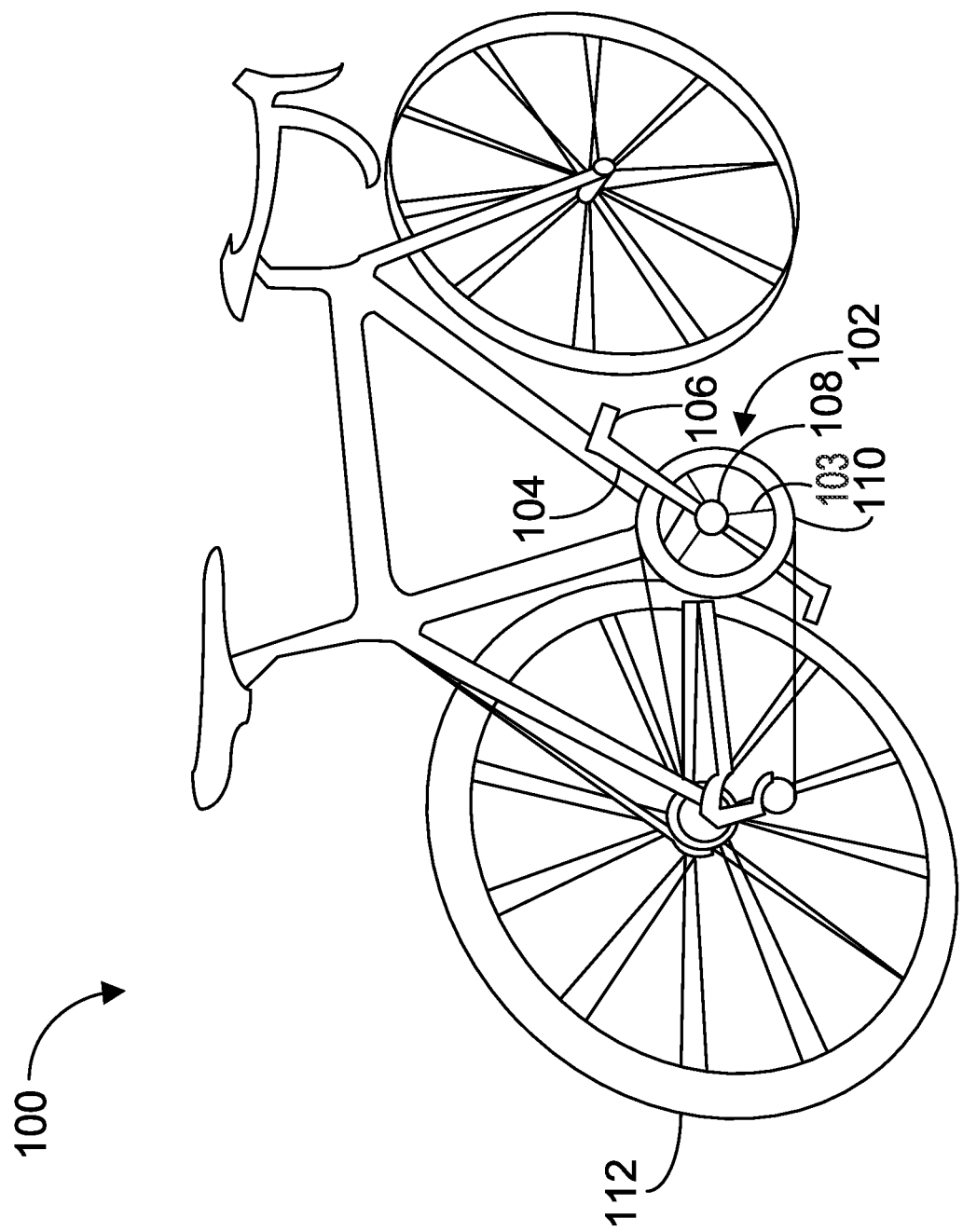
FIG. 1 schematically shows an example bicycle.

Human-powered cycles, such as bicycles, unicycles, tricycles, etc., typically incorporate a drivetrain configured to translate motion of a crank arm into rotation of a wheel. FIG. 1 schematically shows an example bicycle 100 including a drivetrain including a crank assembly 102. Crank assembly 102 includes two crank arms (e.g., right crank arm 104) with pedals (e.g., right pedal 106) affixed to the ends of the crank arms. The two crank arms are each attached to a crank spindle 108 and mounted 180 degrees apart.

The crank spindle may be attached to a rear wheel drivetrain connector configured to translate motion of the crank arms into motion of the rear wheel of the cycle. In the case of bicycle 100, spindle 108 is attached to a chainring 110. Spindle 108 may be attached to chainring 110 via a cycle spider 103 or another suitable connector. Chainring 110 rotates with spindle 108, and this rotation is applied to rear wheel 112 via a bicycle chain. Thus, movement of the crank spindle (e.g., caused by application of force to the pedals) causes rotation of the rear wheel of the bicycle, which causes the bicycle to move.

The cycle crank assembly discussed herein will primarily be described with respect to bicycles—i.e., human-powered cycles having two wheels. However, similar crank assemblies may be incorporated into cycles having any suitable number of wheels. Crank assembly 102 may be used with any suitable rear wheel drivetrain connector. For example, bicycle 100 uses a bicycle spider, chainring, and bicycle chain to transfer power to real wheel 112. In other examples, other suitable rear wheel drivetrain connectors may be used—e.g., a belt sprocket for a belt-drive bicycle, or a bevel gear for a shaft-driven bicycle.

Figure 2:
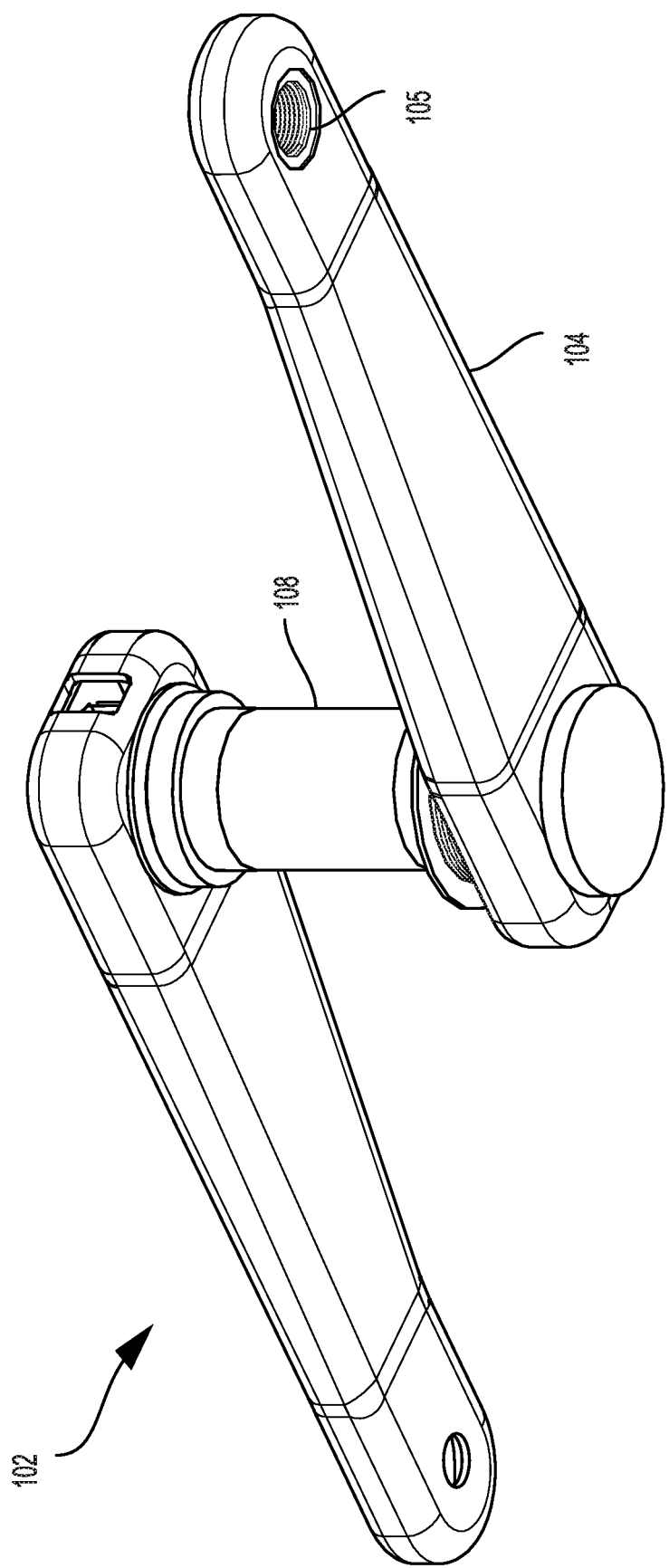
FIG. 2 shows portions of an example cycle crank assembly.

FIG. 2 shows another view of a portion of cycle crank assembly 102. In this view, crank assembly 102 has been removed from bicycle 100, and pedal 106 and chainring 110 have been removed from the crank assembly. As shown, crank arm 104 includes a pedal interface 105 configured to accept a pedal spindle of pedal 106 shown in FIG. 1. Furthermore, FIG. 2 more closely shows the attachment between crank arm 104 and crank spindle 108. Typically, crank spindle 108 will be positioned within a bottom bracket of bicycle 100 along with one or more bearings, thereby securing and stabilizing the crank spindle while allowing the crank spindle to freely rotate.

There are a variety of ways in which a crank arm is typically attached to a crank spindle. In more conventional bicycle drivetrains, the attachment between the crank arm and the crank spindle is configured to prevent slipping of one relative to the other. In other words, it is not generally possible to rotate a crank arm without causing an equal rotation of the crank spindle attached to the crank arm. Rather, the drivetrain is substantially rigid, such that power transfer from the crank arm to the rotating wheel is practically instantaneous and does not change along the components of the drivetrain.

In contrast, cycle crank assembly 102 incorporates a slip connection between the crank arm and crank spindle. Unlike conventional crank assemblies, the crank arm is able to rotate about the crank spindle. In other words, the crank arms can rotate more than the crank spindle throughout part of a pedal stroke, and the crank arms can rotate less than the crank spindle throughout another part of the pedal stroke.

Figure 3A:
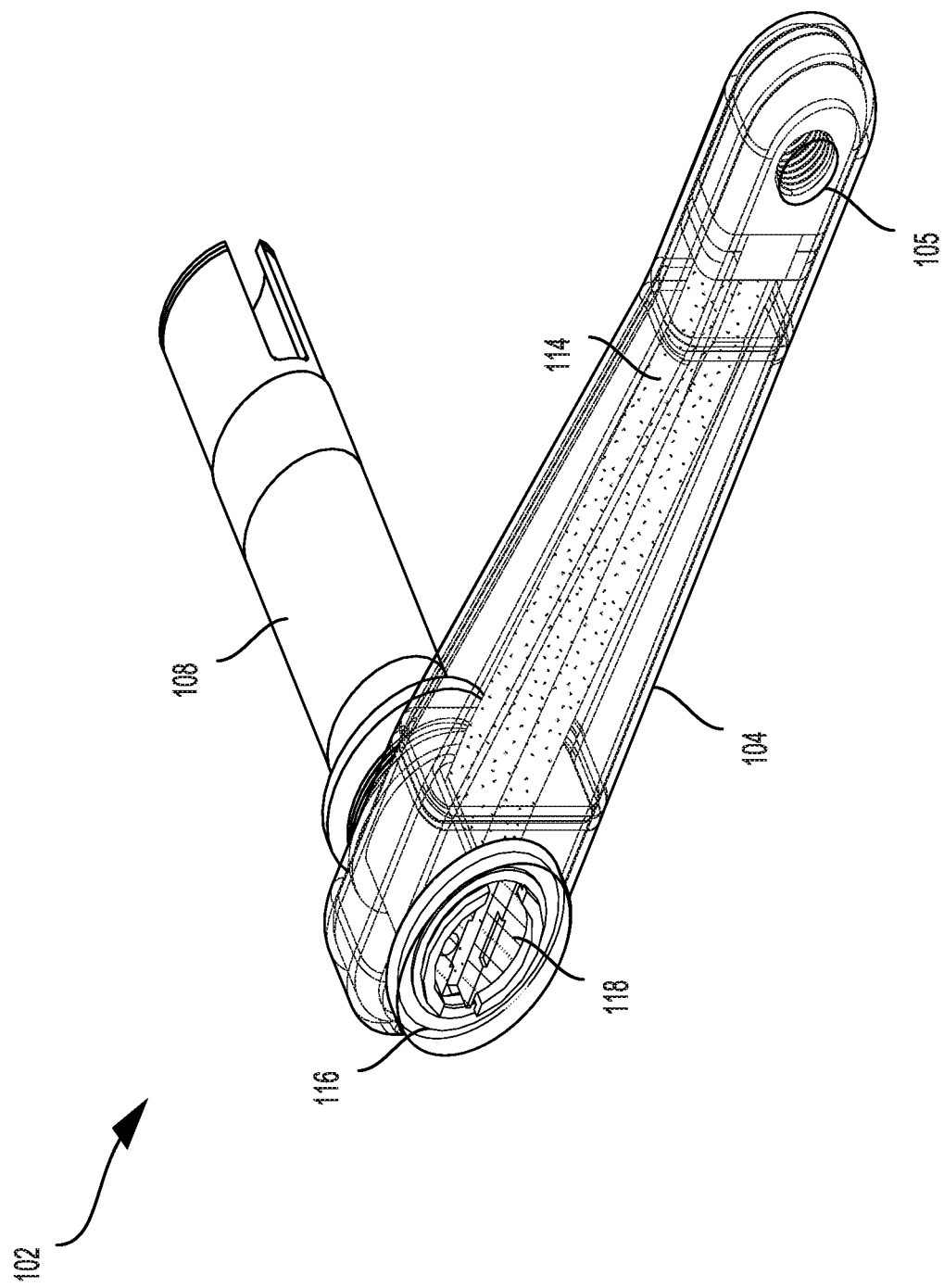
FIGS. 3A and 3B show portions of another example cycle crank assembly.
Figure 3B:
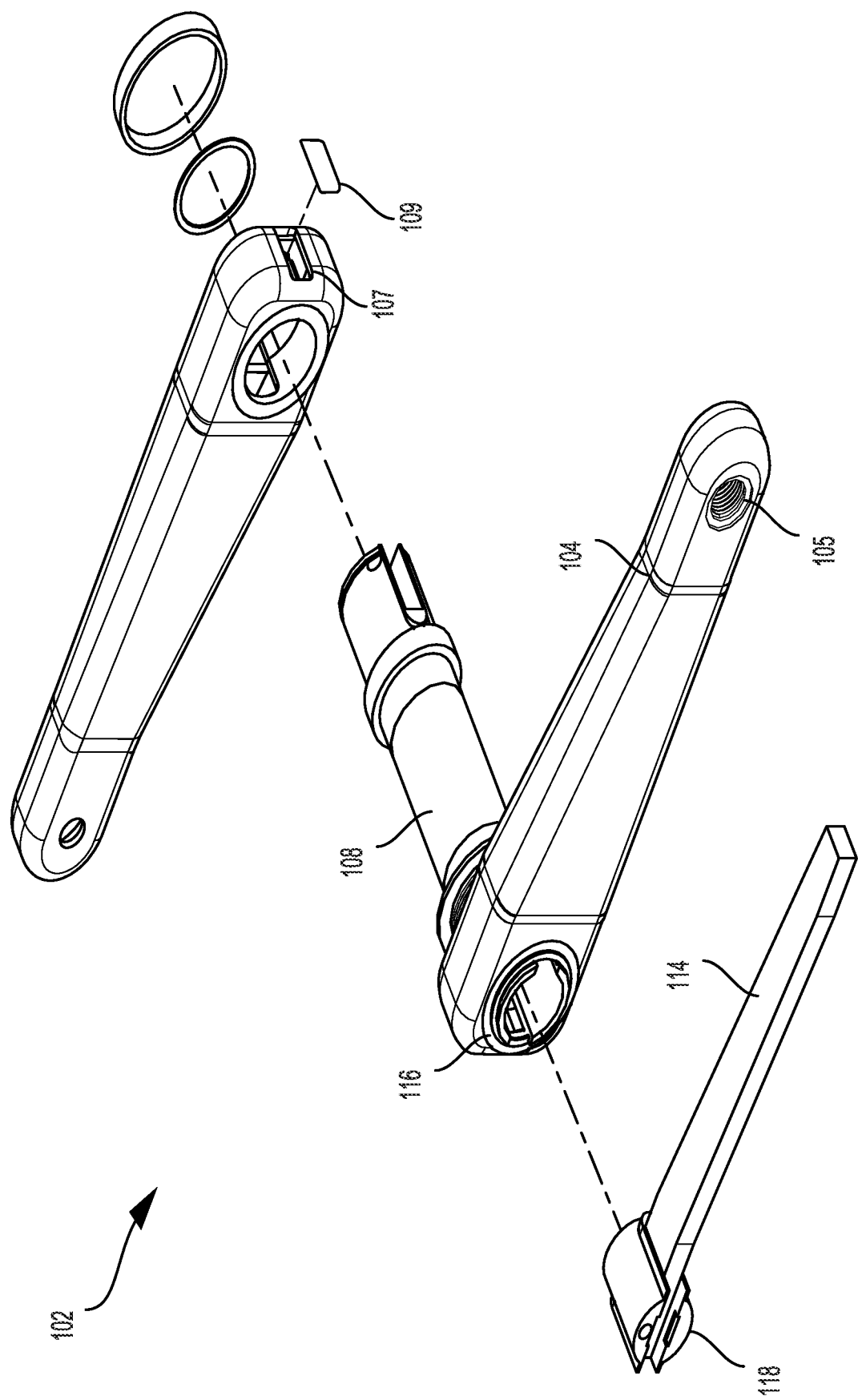

FIGS. 3A and 3B show other partial views of cycle crank assembly 102. FIG. 3A shows the crank assembly in an assembled state, while FIG. 3B shows an exploded view. Furthermore, in FIG. 3A, crank arm 104 is shown as being partially transparent.

As shown in FIGS. 3A and 3B, crank assembly 102 further includes a resiliently deformable member 114 and a slip connection 116, visible in FIG. 3A through the transparent crank arm and in FIG. 3B as exploded components. While FIGS. 3A and 3B only show right crank arm 104 having a resiliently deformable member and slip connection, the left crank arm may include a resiliently deformable member and slip connection as well. Because resiliently deformable member 114 is attached to crank arm 104, rotation of the crank arm causes corresponding rotation of the resiliently deformable member, which is translated to crank spindle 108. However, when a load is applied to the crank arm (e.g., during a pedal downstroke), some amount of deformation of resiliently deformable member 114 will occur. Thus, in response to the load, crank arm 104 will rotate, and resiliently deformable member 114 will deform (i.e., bend), storing a portion of the energy transferred by the load. At this time, the crank arm will "slip" somewhat relative to crank spindle 108, meaning the crank arm will rotate about the crank spindle. In one example, the crank arm may rotate by as much as one to four degrees around the spindle under load.

Figure 4A:
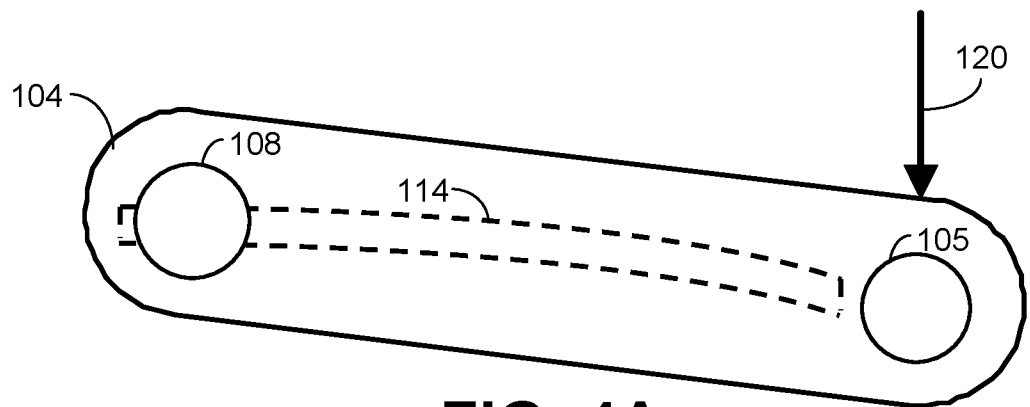
FIGS. 4A and 4B schematically illustrate deformation of a resiliently deformable member of a cycle crank assembly.

The amount of "slip" and corresponding amount of energy storage is proportional to the force applied to the pedal. Higher forces will cause relatively more slip and relatively more energy storage. As such, the maximum amount of slip and corresponding amount of energy storage will generally occur from the pedal downstroke when the pedal is at approximately 90 degrees and pedal forces 120 are highest in the direction of rotation (as shown in FIG. 4A). As such, the pedal downstroke may cause the crank arm 104 to rotate more than the crank spindle 108, but at least some of the difference in rotation may be stored as spring energy in the resiliently deformable member 114. This stored spring energy may be returned when relative force in the direction of rotation (i.e., pedal force 120) on the pedal decreases.

Figure 4B:
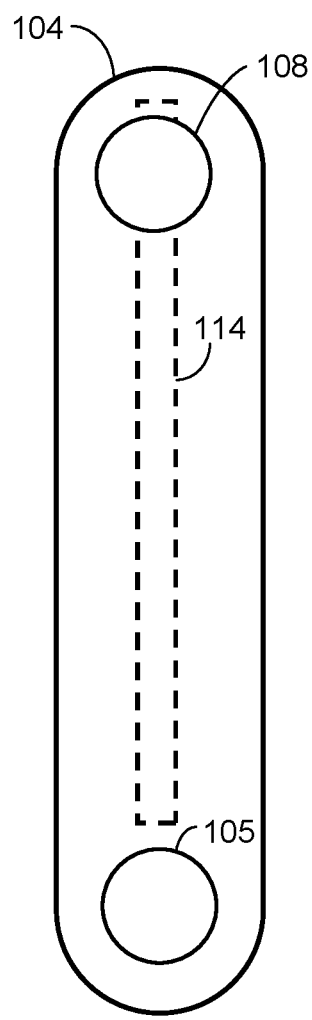

The minimum amount of force on the pedal in the direction of rotation will generally occur during the pedal dead stroke, when the pedal is at approximately 180 degrees (As shown in FIG. 4B). As such, as relative pedal force and effective torque decreases during the pedal dead stroke, the resiliently deformable member 114 may return to its original shape and stored energy from the resiliently deformable member 114 may be returned. The released energy causes the crank spindle 108 to rotate faster than the crank arm 104, and the released energy may be transferred to the rear wheel drivetrain connector. In essence, the resiliently deformable member smoothes the cyclist's output by storing some energy from the cyclist's most powerful portions of a pedal stroke and returning the stored energy during the cyclist's least powerful portions of the pedal stroke.

Based on preliminary testing, it is thought that the cycle crank assembly disclosed herein can improve the efficiency with which power is transferred to a rotating wheel by at least 4%. The experimental configuration included a bicycle mounted to a computerized training stand. According to the design of the training stand, the rear wheel of the bicycle was removed, and the bicycle drivetrain was attached to a disc incorporated into the training stand, such that power provided to the drivetrain of the bicycle caused rotation of the disc. Sensors attached to the disc allowed power, as well as equivalent ground speed and distance, to be measured. The power and total energy provided by the cyclist to each pedal was also measured using pedal-based power meters.

The experiment was conducted in eight 30-minute sessions, including four sessions with a conventional crank assembly as well as four sessions with the modified crank assembly described herein. The average speed target, as measured at the training stand, was 19.3 km/h, at a 3% slope to prevent freewheeling and coasting during the test. When the results for each set of four sessions were averaged, the conventional crank assembly showed an average power of 197.2 W and an average total energy expenditure of 355 kJ, both measured at the pedals. For the modified crank assembly described herein, the average power was 187.8 W and the average total energy expenditure was 337.75 kJ. Despite the different power and energy readings, and as measured at the training stand, each crank assembly had the same average speed (19.3 km/h), cadence (71 rpm), and equivalent distance (9.66 km), when averaged across the four sessions for each crank assembly.

In other words, the modified crank assembly described herein achieved the same average speed and equivalent ground distance despite the cyclist providing overall less power and energy to the pedals, on average. This represents an approximately 4% increase in cycling efficiency as compared to a conventional crank assembly. It is thought that the improvement can be attributed to an overall smoother torque profile, as power supplied by the cyclist during the pedal down stroke was stored by the resiliently deformable member and released during the pedal dead stroke. Energy savings may also potentially arise through reduced flexing of the bicycle frame and other components.

Additional details regarding an example configuration of the cycle crank assembly will now be described with respect to FIG. 3A. In FIG. 3A, resiliently deformable member 114 is shown disposed within a hollow of crank arm 104. The hollow will typically be larger in size than the resiliently deformable member along at least part of the length of the hollow so as to permit deformation of the resiliently deformable member while under load. However, the hollow may have any suitable size and shape. In some examples, the hollow may narrow to have substantially the same size and shape as the resiliently deformable member proximate to pedal interface 105, such that the resiliently deformable member is snugly secured within the hollow. The hollow may additionally or alternatively include clips, brackets, magnets, and/or other fasteners configured to secure the resiliently deformable member in place. For example, FIG. 3A shows a member holder 118 configured to secure the pedal-distal end of resiliently deformable member 114 within a hollow of crank spindle 108.

As shown in FIG. 3A, slip connection 116 and crank spindle 108 each incorporate cutouts sized and shaped to accommodate the resiliently deformable member. Furthermore, the crank arm may have a window 107 that aligns with the cutouts. Accordingly, the resiliently deformable member may be installed by sliding the pedal-proximate end of the resiliently-deformable member through the window, the slip connection cutout, and the crank spindle cutout until the pedal-proximate end of the resiliently deformable member is securely seated proximate to the pedal interface. At this point, the pedal-distal end of the resiliently-deformable member will be within the hollow of crank spindle 108, as shown in FIG. 3A. A protective cover or cap 109 may optionally be installed to cover and protect the pedal-distal end of the resiliently-deformable member post-installation.

In other examples, the resiliently-deformable member may be installed and secured in any suitable way. Furthermore, the resiliently deformable member need not be positioned within the crank arm and may instead be external to the crank arm.

The resiliently deformable member may have any suitable size and shape. In some examples, the resiliently deformable member may be implemented as a leaf spring, with any suitable spring constant. The leaf spring may have a thickness of, for example, between 6 and 10 mm. The leaf spring may have a spring constant such that a load of 100 lbs. causes a deformation of between 0.1 and 0.5 inches, while a load of 200 lbs. causes a deformation of between 0.2 and 1.0 inches. In other examples, the resiliently deformable member may have another suitable spring constant, structure, and/or composition. A preferred material for the leaf spring is fiberglass composite.

Components of crank assembly 102 may be made from any suitable materials. In some examples, crank arm 104, crank spindle 108, resiliently deformable member 114, etc., may be made from some variety of metal (e.g., steel or aluminum). In other examples, it may be beneficial for these components to be constructed from relatively light-weight components, such as high-durability plastics, carbon fiber, fiberglass composites, etc. Furthermore, the components of cycle crank assembly 102 may be constructed from multiple materials, depending on what is optimal or desirable for each individual component.

As discussed above, slip connection 116 permits rotation of crank arm 104 about crank spindle 108. Slip connection 116 may take any suitable form. In the example of FIGS. 3A and 3B, slip connection 116 includes a sleeve bearing having two cutouts for resiliently deformable member 114 to pass through. Crank spindle 108 has similar cutouts, allowing resiliently deformable member 114 to pass through the hollow of the crank spindle as described above, where it is held in place by a member holder 118. However, in other examples, the slip connection may take another suitable form, provided it permits rotation of the crank arm about the crank spindle. In general, the shapes and arrangement of components shown in FIGS. 3A and 3B are presented as an example, and numerous changes may be made.

Crank assembly 102 may provide numerous advantages in addition to improving pedaling efficiency. In one example, when a cyclist is accelerating after turning a corner, the maximum torque applied by the cyclist to the crank arms is reduced by the resiliently deformable members and not instantaneously transferred to the rotating wheel. This reduces the risk that the rotating wheel will slip, especially on a wet road surface. Furthermore, the resiliently deformable members may serve to absorb shocks to the cycle (e.g., when riding over a rough road surface), which can result in a smoother ride for the cyclist. Absorption of force by the resiliently deformable member can also reduce stresses and shocks to the cycle frame itself.

It will be understood that the configurations and/or approaches described herein are exemplary in nature, and that these specific embodiments or examples are not to be considered in a limiting sense, because numerous variations are possible.

The subject matter of the present disclosure includes all novel and non-obvious combinations and sub-combinations of the various systems and configurations, and other features, functions, acts, and/or properties disclosed herein, as well as any and all equivalents thereof.

The invention claimed is:

1. A cycle crank assembly, comprising:
    a crank spindle;
    a drivetrain connector configured to translate rotation of the crank spindle into rotation of a wheel;
    a crank arm including a pedal interface configured to receive a pedal spindle of a cycle pedal;
    a slip connection configured to allow the crank arm to rotate about the crank spindle; and
    a resiliently deformable member connected to the crank spindle and to the crank arm proximate to the pedal interface, wherein the resiliently deformable member translates rotation of the crank arm into rotation of the crank spindle, and wherein the resiliently deformable member deforms under load to store pedal energy provided by a rider to the cycle pedal, and returns at least a portion of the pedal energy when not under load in a direction of the rotation.

2. The cycle crank assembly of claim 1, wherein the slip connection includes a sleeve bearing.

3. The cycle crank assembly of claim 1, wherein the resiliently deformable member is disposed within a hollow defined within the crank arm.

4. The cycle crank assembly of claim 3, wherein the hollow defined within the crank arm is larger in size than the resiliently deformable member along at least a portion of a length of the hollow so as to permit deformation of the resiliently deformable member when under load.

5. The cycle crank assembly of claim 4, wherein the hollow defined within the crank arm narrows proximate to the pedal interface of the crank arm.

6. The cycle crank assembly of claim 3, wherein the crank arm includes one or more internal fasteners configured to secure the resiliently deformable member in place within the hollow defined within the crank arm.

7. The cycle crank assembly of claim 3, wherein the slip connection and crank spindle each define cutouts sized and shaped to accommodate the resiliently deformable member.

8. The cycle crank assembly of claim 7, wherein the hollow defined within the crank arm terminates at a window that aligns with the cutouts of the slip connection and crank spindle, such that the resiliently deformable member is insertable through the window of the crank arm and the cutouts of the slip connection and crank spindle to occupy the hollow.

9. The cycle crank assembly of claim 8, further comprising a protective cap removably affixable to the window of the crank arm.

10. The cycle crank assembly of claim 1, wherein the resiliently deformable member is a leaf spring.

11. The cycle crank assembly of claim 10, wherein the leaf spring has a thickness of between 6 and 10 mm.

12. The cycle crank assembly of claim 1, wherein the resiliently deformable member is comprised of fiberglass composite.

13. The cycle crank assembly of claim 1, wherein the drivetrain connector includes a cycle spider, chainring, and cycle chain.

14. The cycle crank assembly of claim 1, wherein the cycle is a bicycle having two wheels including the wheel.

15. The cycle crank assembly of claim 14, wherein the wheel is a rear wheel and the drivetrain connector translates rotation of the crank spindle into rotation of the rear wheel of the bicycle.

16. A bicycle crank assembly, comprising:
    a crank spindle;
    a drivetrain connector configured to translate rotation of the crank spindle in a direction of rotation into rotation of a rear wheel of the bicycle;
    a crank arm including a pedal interface configured to receive a pedal spindle of a bicycle pedal;
    a slip connection configured to allow the crank arm to rotate about the crank spindle; and
    a resiliently deformable member connected to the crank spindle and to the crank arm proximate to the pedal interface, wherein the resiliently deformable member translates rotation of the crank arm into rotation of the crank spindle, and wherein the resiliently deformable member deforms under load to store pedal energy provided by a rider to the bicycle pedal, and returns at least a portion of the pedal energy when not under load in the direction of rotation.

17. The bicycle crank assembly of claim 16, wherein the slip connection includes a sleeve bearing.

18. The bicycle crank assembly of claim 16, wherein the resiliently deformable member is disposed within a hollow defined within the crank arm.

19. The bicycle crank assembly of claim 16, wherein the resiliently deformable member is a fiberglass composite leaf spring.

20. A cycle crank assembly, comprising:
    a crank spindle;
    a drivetrain connector configured to translate rotation of the crank spindle in a direction of rotation into rotation of a wheel;
    two crank arms interfacing with opposite ends of the crank spindle via slip connections configured to allow the crank arms to rotate about the crank spindle, each crank arm including a pedal interface configured to receive a pedal spindle of a cycle pedal, and each crank arm defining an internal hollow; and
    two leaf springs, each leaf spring connected to the crank spindle and disposed within the internal hollow of one of the two crank arms, such that each leaf spring translates rotation of its crank arm into rotation of the crank spindle, and wherein each leaf spring deforms under load to store pedal energy provided by a rider to the cycle pedal, and returns at least a portion of the pedal energy when not under load in the direction of rotation.

* * * * *